Sept. 4, 1928. 1,683,550
D. E. KEECH
TOAST INSPECTOR
Filed Jan. 21, 1924 2 Sheets-Sheet 1
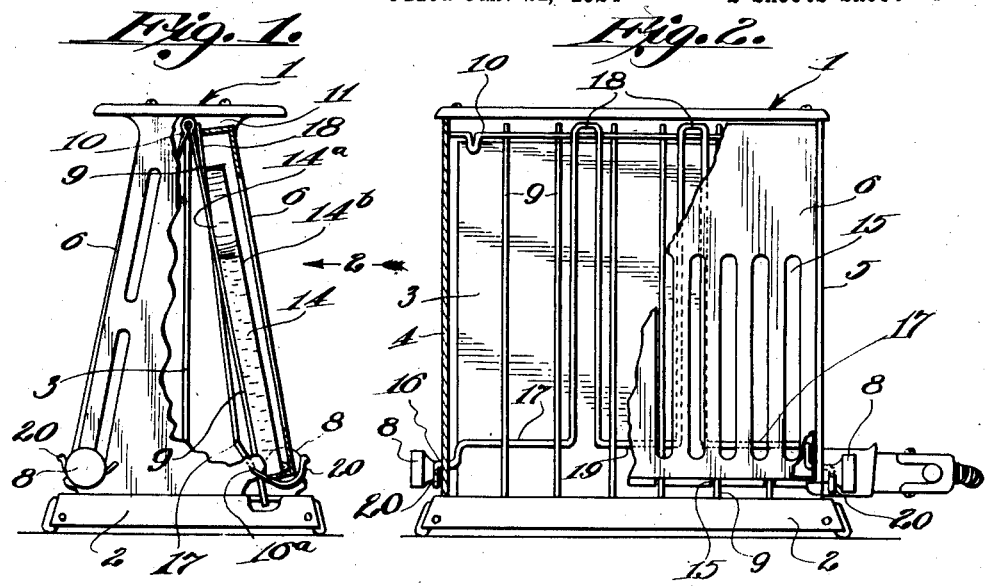
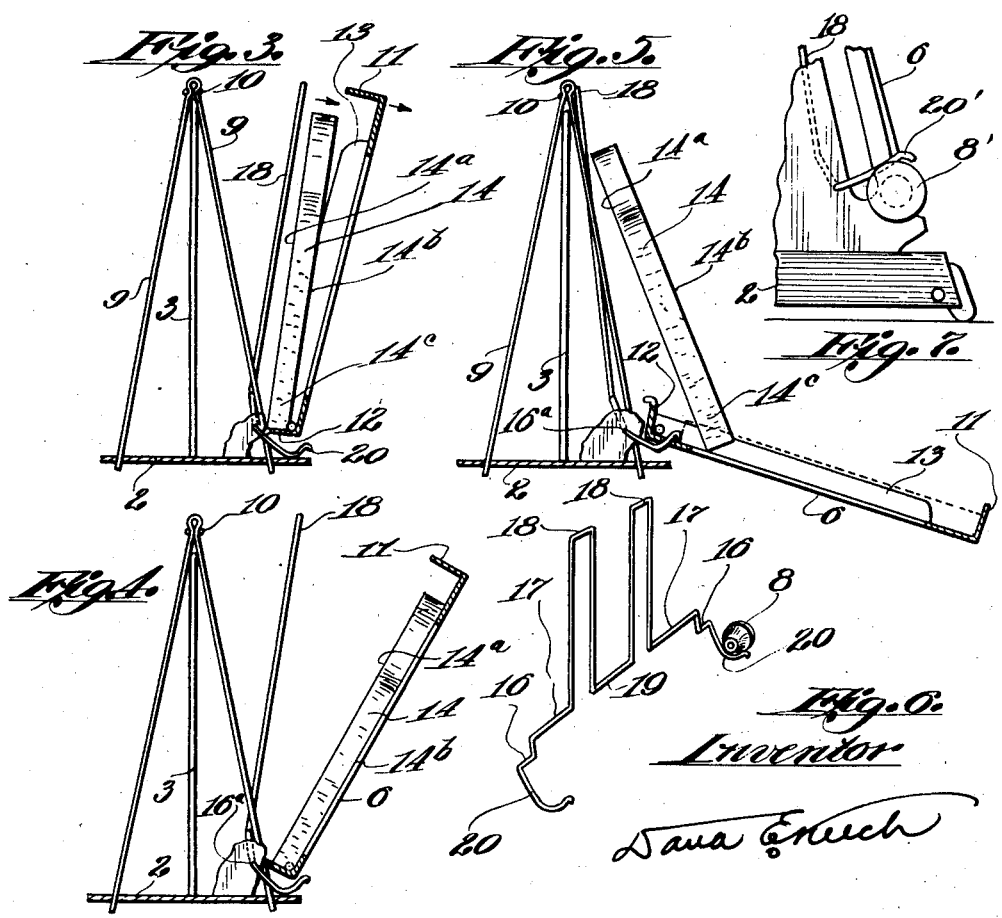

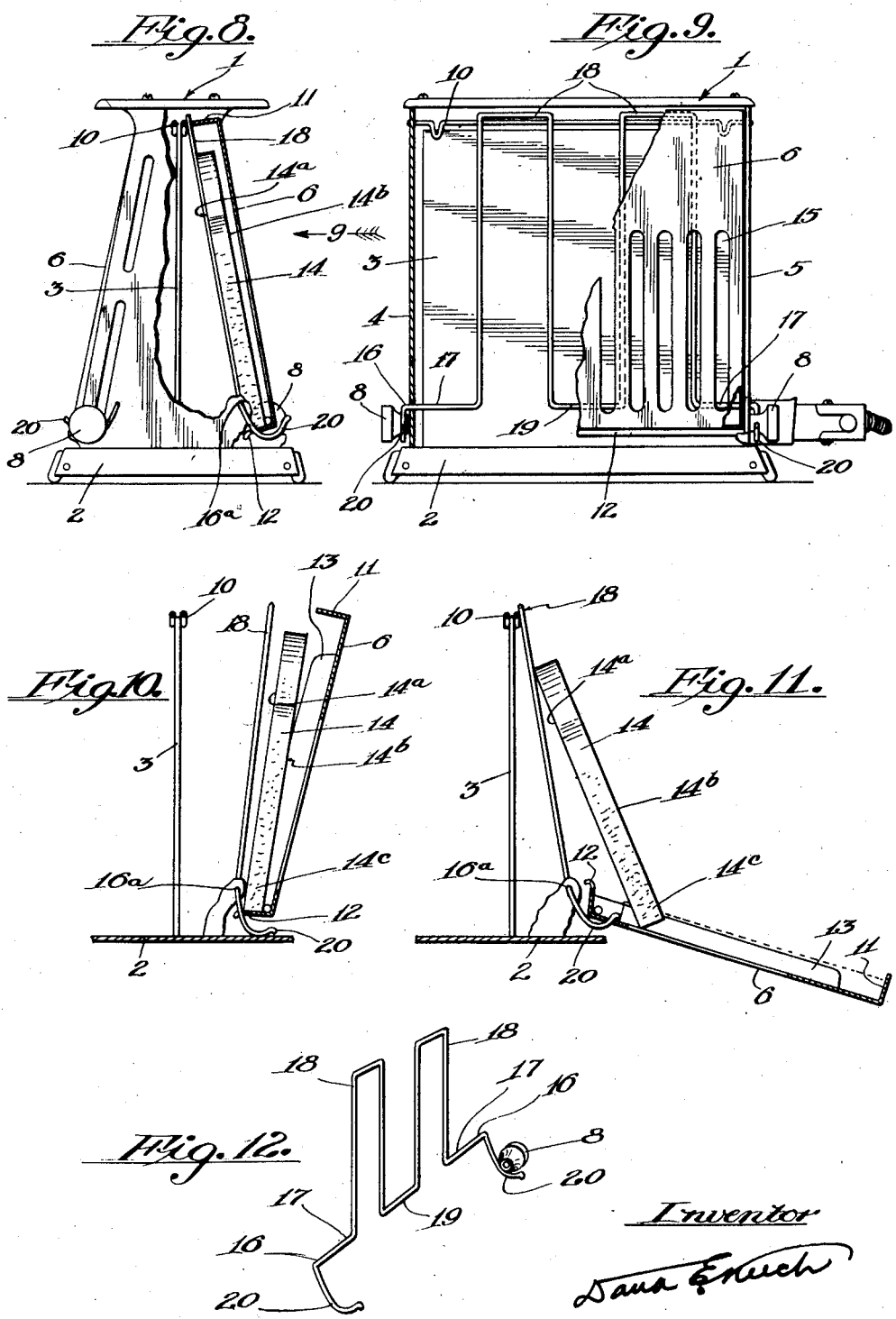

Patented Sept. 4, 1928.

1,683,550

UNITED STATES PATENT OFFICE.

DANA E. KEECH, OF LOS ANGELES, CALIFORNIA.

TOAST INSPECTOR.

Application filed January 21, 1924. Serial No. 687,592.

My invention relates to bread toasting devices, and more particularly to an improved mechanism for handling the bread in a toaster.

The broad object of my invention is to provide a device to be associated with a well known bread toaster which will permit the user thereof to present to view, at will and with a minimum of effort, the bread surface being exposed to the toasting element.

A further object is to provide such a device as may be associated with a well known toaster so that when operated in conjunction with the bread toasting mechanism thereof it will cause the bread surface being toasted to appear to view but which will not interfere with the normal function of the bread turning device when the latter is operated separately.

A further object is to provide my device for displaying the toasting surface of the bread with means whereby it may be operated or not as desired by the same movement of the hand which effects operation of the bread turning mechanism.

Other objects and advantages will be made manifest in the following specification and accompanying drawings, in which:—

Figure 1. is a side elevation of a toaster with which my invention is associated, broken away to show a piece of bread in toasting position therein.

Fig. 2. is a front elevation taken in the direction of arrow 2, Figure 1, the bread shown in Figure 1 being left out and a portion of the bread pan and the adjacent frame end being broken away to show the bread tilting device comprising the present invention.

Fig. 3. is a diagrammatic view taken in the same direction as Figure 1 and illustrating the essential parts of the toaster and my invention in the act of tilting a piece of bread in order to permit inspection of the toasting side thereof.

Fig. 4. is a view similar to Fig. 3 and illustrates the completion of the act shown as started in Fig. 3.

Fig. 5. is a view similar to Fig. 3 and illustrates the bread turning function of the toaster which takes place when the pan is swung from toasting position to receiving position without operating the tilter comprising my invention in conjunction with the pan.

Fig. 6. is a perspective view of the tilter comprising my invention with a pan swinging finger knob shown in such spaced relation to a tilter operating thumb lever as it would bear when the tilter is in a rest position.

Fig. 7. is a fragmentary elevational view of one side of a toaster which illustrates a modified form of the operating lever with which I may equip my tilting device.

Figs. 8, 9, 10, 11 and 12 are views similar to Figs. 1, 2, 3, 5 and 6, respectively, and illustrate the tilting member so formed and associated with a toaster as to assume, in addition to its bread tilting function, the function of the grid wires of the toaster.

Referring more specifically to the drawing in which similar reference characters refer to similar parts, 1 represents a bread toaster having a frame 2 and a bread toasting element 3. Mounted pivotally in the sides 4 and 5 are foraminous pans 6. The pivots carrying pans 6 pass thru suitable apertures in frame ends 4 and 5 and threadedly receive finger knobs 8 by which pans 6 may be swung from the position in which pan 6 is shown in Fig. 5 to the position in which it is shown in Fig. 1 and back again.

Grid wires 9 decline from a support 10 on each side of the toasting element 3 as shown in Figs. 1 to 5. Bread pans 6 have lips 11 and 12 bent from their upper and lower edges respectively and side flanges 13 for retaining bread which may be placed in the pan.

These elements so far described comprise the structure of the bread toaster with which my invention is very effectively associated. The main feature of this toaster, without the addition of my invention, is that by swinging the pan 6 from the position shown in Fig. 5 to the position shown in Fig. 1, a piece of bread 14 may be disposed against grid wires 9 exposing the face 14ª to the toasting action of the element 3. When it is desired to turn the bread 14 so that the opposite face 14ᵇ may be exposed to the toasting element 3, the pan 6 is swung by one of the thumb knobs 8 from its position as shown in Fig. 1 to that shown in Fig. 5. The lip 12 being provided with apertures 15 to receive grid wires 9, moves upwardly between said wires in the downwardly swinging movement of the pan 6 just described. The end of the lip 12 engages the face 14ª of the bread 14 throwing the lower part 14ᶜ outwardly and causing the bread 14 to fall into the pan 6 with the face 14ª disposed downwardly. This inversion of the bread 14 in the pan 6 now obviously permits the face 14ᵇ to be exposed to the heat of the toasting element 3 by swinging the pan 6 back to the position shown in Figure 1.

This is a very unique and useful device providing as it does a simple means by which bread may be turned to be toasted on opposite sides without the necessity of its being handled. However, in the toaster as it is now on the market it is not possible, without using the fingers, for the progress of the toasting action to be ascertained unless the bread is completely turned and observed through the openings in pan 6. By the association of my invention with the device, the handicap described above is overcome in the following manner.

A tilting rock shaft is formed, preferably of a single piece of wire bent into the shape illustrated in Fig. 6. This shaft pivots about the portions 16 which are journaled in suitable apertures 16ª provided in frame ends 4 and 5. At the inner ends of pivot portions 16 the wire is bent upwardly and inwardly to form offset stop portions 17. Sufficient material is provided between stop portions 17 to bend upstanding loops 18 therefrom, connected by stop portions 19 which are preferably aligned with the stop portions 17 as shown in Figs. 6 and 2.

From the outer ends of pivot portions 16 are bent the thumb levers 20, these latter preferably passing close to the frame and underneath the constricted portions of pan swinging thumb knobs 8, as shown in Figs. 1, 2 and 6, and terminating in such a position that they may be either depressed or avoided by the thumb or fingers during the act of turning a knob 8 for the purpose of swinging a pan 6 from its position shown in Fig. 1 to a lower position, as illustrated in Figs. 3, 4, and 5.

Depression of thumb levers 20 projects fingers 18 outwardly between adjacent guard wires 9 from their normal position in which they recline against support 10, as illustrated in Figs. 1 and 5 to the tilting position illustrated in Figs. 3 and 4. This tilting position is determined by the contact of the stop portions 17 and 19 with the grid wires 9. And when the thumb lever 20 is depressed in conjunction with the rotation of a finger knob 8 the bread is tilted from the toasting position shown in Fig. 1 in which it reclines inwardly against the grid wires 9 to the outwardly overbalanced position in which it is shown in Fig. 3 causing it to fall into the pan 6 as illustrated in Fig. 4 with the side 14ª which was just being toasted, presented to view, permitting inspection thereof. In the present embodiment fingers 18 remain in tilting position as shown in Figs. 3 and 4 until pan 6 is returned to toasting position, as shown in Fig. 1 when the lip 11 contacts with the tips of the fingers 18 returning them to their normal position. When the tilting device is in this position and the pan 6 is rotated by a thumb knob 8 from the toasting position shown in Fig. 1 to the bread receiving position shown in Fig. 5 the bread will fall into the pan 6 with the side 14ª downwardly as previously described, the tilting device having no effect upon the turning function when it is not actuated by depression of a thumb lever 20.

A modified form of thumb lever 20 is illustrated in Fig. 7 as passing close to a frame side and above a thumb knob 8, so that actuation of the tilting device may be brought about by a drawing downwardly of the thumb lever 20 by the thumb or finger instead of the pushing action by which the thumb lever is depressed in the preferred embodiment.

Only a slight modification of the tilting device is necessary in order for it to take over all the functions of the grid wires 9 and retain the tilting function described above. Such changes are illustrated in Figs. 8 to 12 and would comprise the eliminating of the stop portions 17, as such, forming them coextensively with pivots 16 and journalling such pivots in the sides 4 and 5 so that the portions 17 and 19 occupy a position above the edge of the lip 12 when this is disposed as shown in Fig. 8. Thus in the oscillating of the pan 6 from the toasting position shown in Fig. 8 to the receiving position shown in Fig. 11, the portions 17 and 19 will cause the adjacent edge of the end 14ᶜ of the bread 14 to engage the lip 12 inside of its extremity, this resulting in the bread 14 falling with the face 14ª downwardly into the pan 6 as illustrated in Fig. 11 and in the same manner accomplish by the previously described construction.

A stop for limiting the outward movement of the fingers 18 is provided by forming the thumb levers 20 to contact with the base of the frame 2 when the fingers 18 have tilted outwardly a suitable distance as illustrated in Fig. 10.

While I have herein described one form of my invention, modifications thereof may be devised without departing from the spirit thereof, and it is to be understood that such modifications come within the scope of this invention.

What I claim is:

1. In a toaster the combination of: a heating element; a bread carrier having a primary position for receiving a piece of bread and a secondary position for disposing it in toasting position adjacent to said heating element; means for causing said piece of bread to move from toasting position and be deposited toasted side down upon said carrier when the latter is in primary position; and means for causing said piece of bread to move from toasting position and be deposited toasted-side up in said carrier.

2. In a toaster the combination of: means for supporting a piece of bread on an inclined plane; a horizontally pivoted bread carrier; means for shifting the bottom of the bread outwardly into said carrier so that it will fall upon the carrier with inner face downward; and means for optionally tilting the top of the bread outwardly so the bread will fall into the carrier, inner face upward.

3. In a toaster the combination of: means for supporting a piece of bread on an inclined plane; a horizontally pivoted bread carrier; means for shifting the bottom of the bread outwardly into said carrier so that it will fall upon the carrier with inner face downward; and a bell crank for optionally tilting the top of the bread outwardly so the bread will fall into the carrier, inner face upward.

4. In a toaster the combination of: a heating element; a bread carrier having a primary position for receiving a piece of bread and a secondary position for disposing it in toasting position adjacent to said heating element; means for causing said piece of bread to move from toasting position and be deposited toasted-side down upon said carrier when the latter is in primary position; and a grid member disposed between said heating element and said piece of bread when the latter is in toasting position, said grid member being movable to tilt said piece of bread outwardly so it will be deposited upon said carrier toasted-side up.

5. In a toaster the combination of: a heating element; means for supporting a piece of bread on an inclined plane adjacent to said heating element; a horizontally pivoted bread carrier; means for shifting the bottom of the bread outwardly into said carrier so that it will fall upon the carrier with inner face downward; and a grid member disposed between said heating element and said piece of bread when the latter is in toasting position, said grid member being movable to tilt said piece of bread outwardly so it will be deposited upon said carrier, inner face upward.

6. In a toaster the combination of: a heating element; a bread carrier having a primary position for receiving a piece of bread and a secondary position for disposing it in toasting position, adjacent to said heating element; means for causing said piece of bread to move from toasting position and be deposited toasted-side down upon said carrier when the latter is in primary position; and means for causing said piece of bread to move from toasting position and be deposited toasted-side up in said carrier, said last mentioned means being optionally operable in conjunction with the moving of said carrier from secondary to primary position.

7. In a toaster the combination of: a heating element; a bread carrier having a primary position for receiving a piece of bread and a secondary position for disposing it in toasting position adjacent to said heating element; means for causing said piece of bread to move from toasting position and be deposited toasted-side down upon said carrier when the latter is in primary position; a grid member disposed between said heating element and said piece of bread when the latter is in toasting position, said grid member being movable to tilt said piece of bread outwardly so it will be deposited upon said carrier toasted-side up; and stops for limiting the movement of said grid member.

8. In a toaster the combination of: means for supporting a piece of bread on an inclined plane; a horizontally pivoted bread carrier; means for shifting the bottom of the bread outwardly into said carrier so that it will fall upon the carrier with inner face downward; a bell crank for optionally tilting the top of the bread outwardly so that bread will fall into the carrier, inner face upward; and stops for limiting the movement of said bell crank.

9. In a toaster the combination of: means for supporting a piece of bread on an inclined plane; a horizontally pivoted bread carrier; means for shifting the bottom of the bread outwardly into said carrier so that it will fall upon the carrier with inner face downward; means for optionally tilting the top of the bread outwardly so the bread will fall into the carrier, inner face upward; an operating handle provided upon said carrier; and an operating handle provided upon said tilting means, said handles being optionally manually operable together.

10. In a toaster the combination of: means for supporting a piece of bread on an inclined plane; a horizontally pivoted bread carrier; means for shifting the bottom of the bread outwardly into said carrier so that it will fall upon the carrier with inner face downward; and a member for optionally tilting the top of the bread outwardly so the bread will fall into the carrier, inner face upward.

11. In a toaster the combination of: means for supporting a piece of bread on an inclined plane; a horizontally pivoted bread carrier; means for shifting the bottom of the bread outwardly into said carrier so that it will fall upon the carrier with inner face downward; a member for optionally tilting the top of the bread outwardly so the bread will fall into the carrier, inner face upward; and stops for limiting the movement of said member.

In testimony whereof I have signed my name to this specification.

DANA E. KEECH.